United States Patent

[11] 3,553,416

| [72] | Inventors | Lester C. Schmiege<br>Kalamazoo Township;<br>Wendell C. Zeluff, Cooper Township,<br>Kalamazoo County, Mich. |
|---|---|---|
| [21] | Appl. No. | 722,326 |
| [22] | Filed | Apr. 18, 1968 |
| [45] | Patented | Jan. 5, 1971 |
| [73] | Assignee | American Wire Cloth Company<br>Parchment, Mich.<br>a corporation of Michigan |

[54] WELDING EQUIPMENT
7 Claims, 5 Drawing Figs.

[52] U.S. Cl. .................................. 219/78,
219/114
[51] Int. Cl. ....................................... B23k 9/00
[50] Field of Search ............................. 219/78, 86,
114, 108, 111

[56] References Cited
UNITED STATES PATENTS
| 2,340,131 | 1/1944 | Lord | 219/114 |
|---|---|---|---|
| 2,397,646 | 4/1946 | Brown et al. | 219/83X |
| 2,895,047 | 7/1959 | Heyd | 219/114X |
| 1,164,634 | 12/1915 | Eveland | 219/86X |
| 2,969,453 | 1/1961 | Page | 219/86 |
| 3,192,466 | 6/1965 | Sylnan et al. | 323/22 |
| 3,234,354 | 2/1966 | Penberg | 219/86 |

*Primary Examiner*—J. V. Truhe
*Assistant Examiner*—Hugh D. Jaeger
*Attorney*—Woodhams, Blanchard and Flynn

ABSTRACT: A welding apparatus including a pair of electrodes connected by elongated electrical conductors to a transformer and a circuit for controlling the duration and strength of the welding current. One electrode is mounted upon a handle containing a normally open switch which is closed when said one electrode is pressed against an object. Closure of said switch initiates a current flow which is accurately terminated after a predetermined period of time controlled by the circuit.

INVENTORS
LESTER C. SCHMIEGE
WENDELL C. ZELUFF
BY
Woodhams, Blanchard and Flynn
ATTORNEYS INVENTORS
LESTER C. SCHMIEGE
WENDELL C. ZELUFF
BY
Woodhams, Blanchard & Flynn
ATTORNEYS

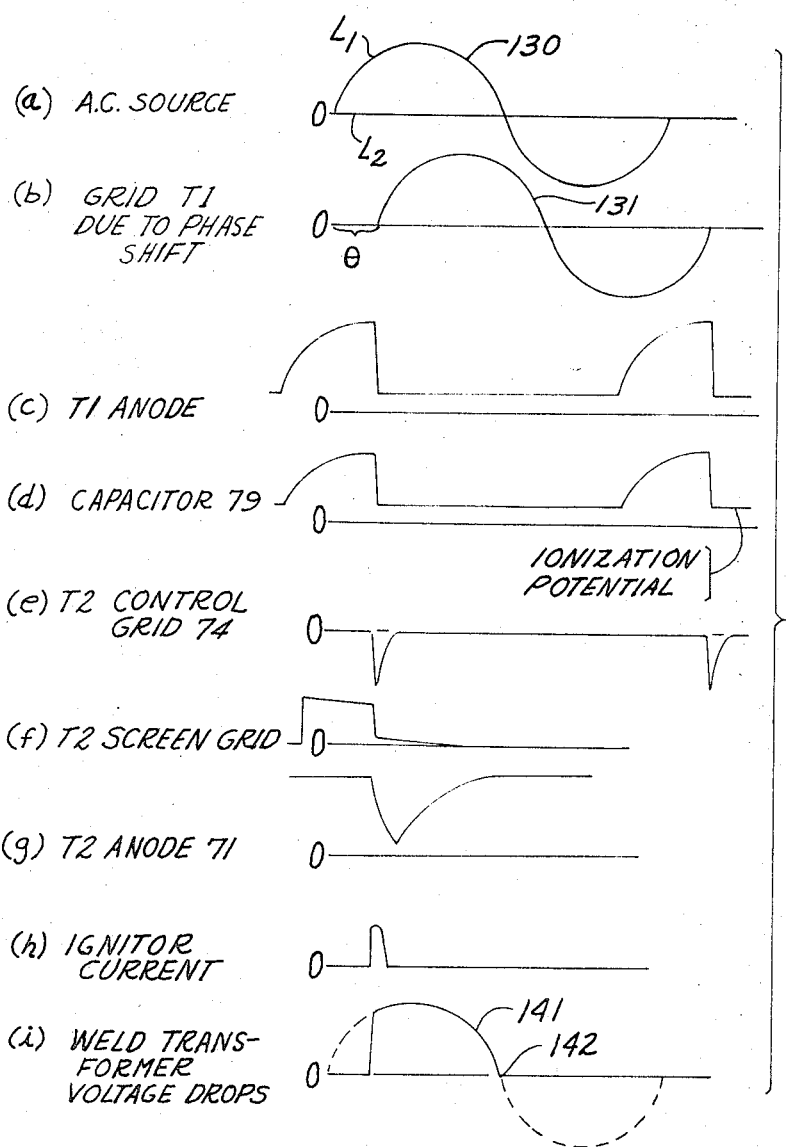

WELDING EQUIPMENT

BACKGROUND OF THE INVENTION

This invention relates in general to a welding apparatus and, more particularly, to a type thereof which is capable of firmly securing small patches or pieces of wire mesh screening to large sheets of such screening in order to repair holes or tears in such sheets without materially impeding the free flow of liquid through the patch portion of the sheet.

Persons acquainted with the use and maintenance of fine mesh wire screen, such as that commonly referred to as fourdrinier screen and used in the manufacture of paper, have long been aware of the problems encountered in attempting to repair such screen. In the first place, fourdrinier screen, which is specifically mentioned herein for illustrative purposes, is fabricated from relatively fine wire and the openings between the wires must be very small in order to minimize the escape of the fibers used in forming a sheet of paper. Thus, any method and means of patching the fourdrinier screen must, in order to be completely acceptable, avoid a substantial reduction in the openings through the screen as the result of the repairing thereof. Heretofore, repair methods involving a welding operation required highly skilled operators and have many times resulted in damage to the screen in the region of the patch whereby the efficiency of the screen to pass liquids is greatly reduced. Moreover, the problem of burning the fourdrinier screen during attempted repairs frequently increased the amount of the damaged area.

Accordingly, a primary object of this invention is the provision of a welding apparatus whereby a fine mesh wire screen patch can be firmly and permanently attached to a relatively larger sheet of fine mesh wire screen capable of conducting electricity without significantly increasing resistance to the flow of liquids through the patched area, by comparison with the unpatched areas, without materially decreasing the flexibility of the patched area and without increasing the damage or potential damage to the patched area.

A further object of the invention is the provision of a device, as aforesaid, in which the patch is applied by an electric welding operation capable of adjustment and adaptation to screens of different types and sizes and in which both the period of flow and amount of welding current can be accurately controlled and adjusted according to the conductivity of the wire mesh involved.

Other objects and purposes of this invention will become apparent to persons familiar with welding equipment upon reading the following descriptive material and examining the accompanying drawings, in which:

FIG. 5 is a diagram illustrating waveforms appearing in portions of the circuit of FIG. 4.

SUMMARY OF THE INVENTION

The welding apparatus embodying the invention comprises a pair of electrodes adapted for disposition on opposite sides of a sheet and on adjacent patches of wire screen material to be welded together. One of the electrodes is pivotally mounted on a handle in proximity to a switch for actuating said switch when urged against the workpiece. The switch when actuated enables a control circuit to energize a welding transformer across which the electrodes are connected. The welding transformer is energizable through an ignitron switch connected in circuit with an alternating current source. The control circuit includes a phase shift controlled, trigger device which produces a pulse at a preselected phase point in successive cycles of the alternating source. These repetitive pulses are applied to one input of a two-input trigger device. Said switch in said handle, when actuated, energizes a second input of the two-input trigger device. The two-input trigger device is connected for conduction through the ignitor and cathode of the ignitron from a storage device to fire the ignitron for a selected portion of a half cycle of the source in response to energization of both of said inputs.

DETAILED DESCRIPTION

Figure 1:
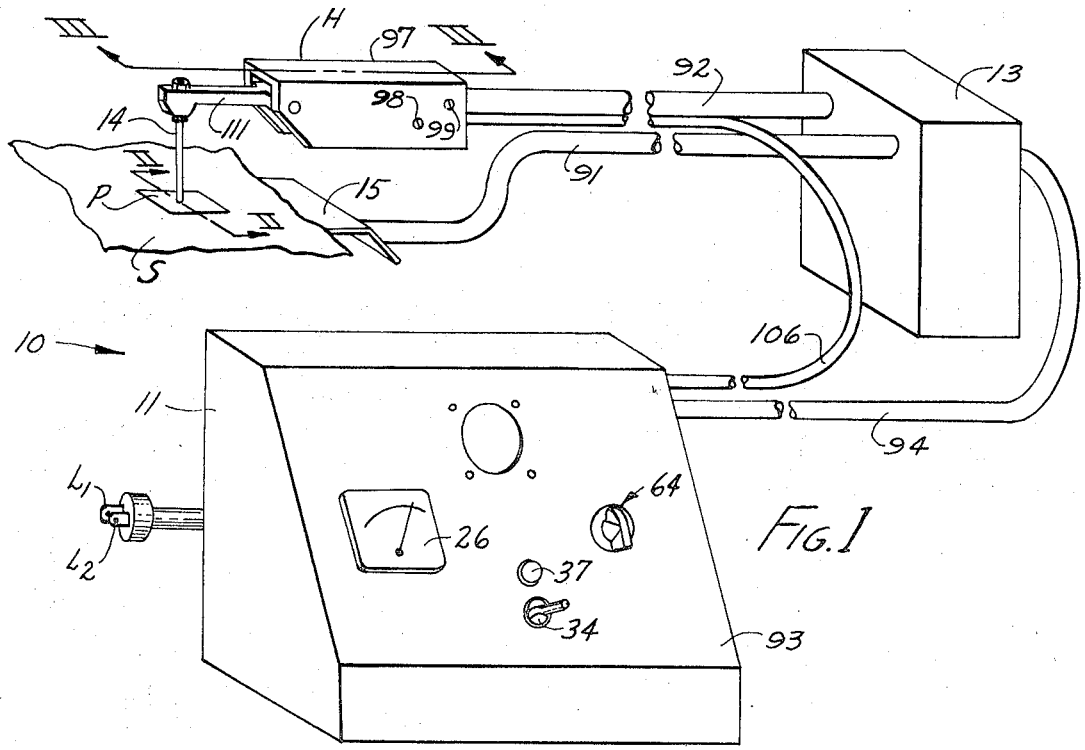
FIG. 1 is a broken, perspective view of a welding apparatus embodying the invention.
Figure 4:
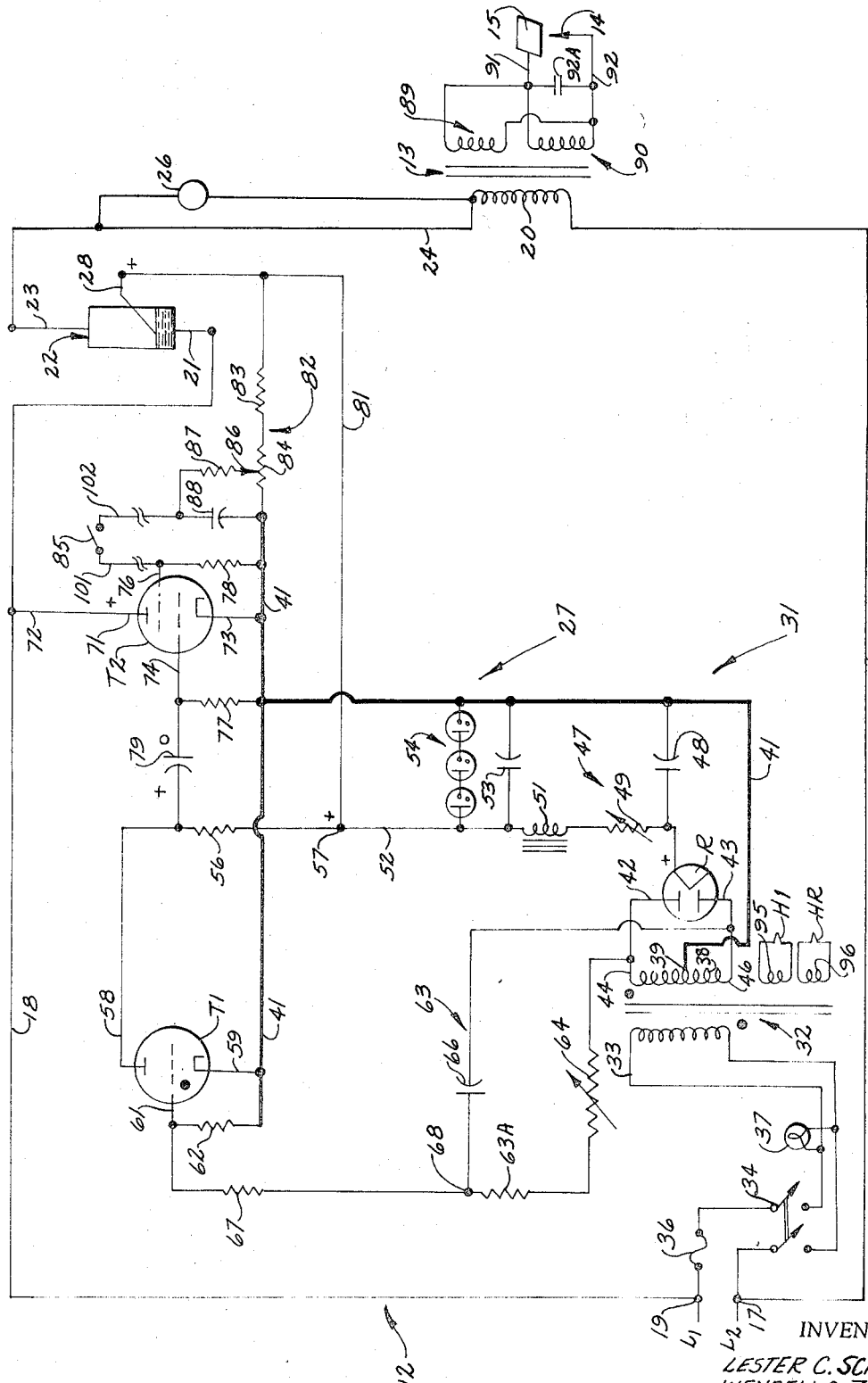
FIG. 4 is a diagram of the control and power circuits for the welding electrodes.

The welding apparatus 10 (FIG. 1) comprises a cabinet structure 11 for housing electrical circuitry 12 (FIG. 4), a housing containing a welding transformer 13 and a pair of welding electrodes 14 and 15. As shown in FIG. 1, electrodes 14 and 15 are intended to be placed on opposite sides of the workpiece set, normally comprising a sheet S of fine mesh wire screen such as a fourdrinier screen and a patch P of relatively coarse mesh, undersize wire to be welded thereto to cover and thereby repair a damaged area or hole in the sheet S. For example, where the sheet S is 75-mesh screen, the patch P is preferably about 50-mesh screen. The electrode 15 is formed as a flat plate which underlies and contacts the lower screen, here the sheet S of the workpiece set. The electrode 14 is supported by a handle H for axial movement into firm contact with the workpiece set on the side thereof opposite the electrode 15 at points to be welded.

The electrical circuitry 12 (FIG. 4) is energized by an electrical source, here a conventional AC source, connected to the input terminals L1 and L2. A conductor 16 connects a junction point 17 on the input line L2 to one side of the primary winding 20 of the welding transformer 13. A conductor 18 interconnects a junction point 19 on the input line L1 with the cathode 21 of an ignitron 22. The anode 23 of the ignitron 22 is connected by a conductor 24 to the other side of the primary winding 20 of the welding transformer 13. In this particular embodiment a current meter 26 is connected in parallel with the conductor 24, which also serves as a shunt for the meter.

The ignitron 22 is regulated by control circuitry 27. Operating potentials for the control circuitry 27 are derived from a DC power supply generally indicated at 31. The DC power supply 31 is energized from a transformer 32. The primary winding 33 of transformer 32 is coupled through a double-pole, single-throw switch 34 to junction points 17 and 19. A fuse 36 is disposed between switch 34 and junction point 19. A pilot lamp 37 is connected across the legs of the primary 33 to indicate energization thereof by closure of switch 34.

The secondary winding 38 of transformer 32 is center tapped at 39. A reference potential line 41 for the control circuit 27 and power supply circuit 31 connects to the center tap 39. The power supply circuit 31 includes a rectifier tube R having anodes 42 and 43 connected to the ends 44 and 46, respectively, of the secondary winding 38. The cathode of rectifier R is connected to a capacitive input filter network 47. The filter network comprises a capacitor 48 connected between the cathode of rectifier R and the reference potential line 41 and a variable resistance 49 and inductance 51 connected in series between the cathode of rectifier R and a line 52 which acts as a positive potential supply line for rest of the control circuit 27.

A relatively large capacitor 53, preferably of several microfarads capacity, and voltage regulating means 54 connect in parallel between the positive potential line 52 and the reference line 41 at the output of the filter network 31. In the particular embodiment shown, the voltage regulator means 54 comprises series of three voltage regulator tubes.

A trigger device T1, here a triode thyratron, is provided with positive anode potential through a dropping resistor 56 connected between a junction point 57 on the positive potential line 52 and the anode 58 thereof. The cathode 59 of thyratron T1 connects to reference line 41. A zero bias is provided to the grid 61 of thyratron T1 through a bias resistor 62 connected to the reference line 41.

A phase shift network 63 comprises a fixed resistor 63a, a variable resistor 64 and capacitor 66 coupled in series across the end terminals 44 and 46 of the secondary winding 38. The grid 61 of thyratron T1 connects through a current limiting resistor 67 to a junction point 68 between the capacitor 66 and resistance 63a of network 63. The phase shift signal path is completed through the grid and cathode of thyratron T1, the reference line 41 and the center tap 39.

A further thyratron T2 has its anode 71 directly connected to the cathode 21 of ignitron 22 through a conductor 72. The cathode 73 of the thyratron T2 connects to the reference potential line 41.

The thyratron T2 is a cold cathode, gas filled tube, having a pair of grids 74 and 76, e.g., a tube of the strobotron type, here an SN4 tube. The grids 74 and 76 are normally biased at zero potential, for nonconduction of thyratron T2, through bias resistors 77 and 78, respectively, connected to the reference line 41. A capacitor 79 connects the control grid 74 to the anode 58 of thyratron T1, rendering the potential of the grid responsive to particular changes of the conductive state of thyratron T1.

The capacitor 53 is couple through the positive potential line 52 and a conductor 81 to the ignitor 28 of ignitron 22.

The line 81 applies positive potential from positive potential line 52 to one end of a resistive voltage divider 82, the other end of which is connected to the reference potential line 41. The voltage divider 82 comprises a resistance 83 and the resistive element of a potentiometer 84. The wiper 86 of potentiometer 84 is connected through a resistor 87 to the upper side of a capacitor 88, the lower side of which is connected to the reference line 41, for applying a high potential thereto. The upper side of capacitor 88 is connectable through a normally open switch 85 to the screen grid 76 of thyratron T2 and through the bias resistor 78 to the reference line 41.

Although the trigger devices T1 and T2 are in this embodiment illustrated as tubes, it is contemplated that the circuit may be adapted to use with comparable solid-state trigger devices (e.g., comparable semiconductor controlled rectifiers) as well as solid-state devices corresponding to the rectifier R, voltage regulating means 54 and ignitron 22. Heater current for the thyratron T1 and rectifier R, here shown, may be supplied by any convenient means such as the heater windings 95 and 96 of transformer 32, the heater filaments being shown at H1 and HR, respectively.

The welding transformer 13 includes a paralleled pair of secondary windings 89 and 90 which are coupled through conductors 91 and 92 to the welding electrodes 15 and 14, respectively. Conductors 91 and 92 may be relatively long, e.g., 18 feet, to allow repair of defects at any point in a wise fourdrinier screen. A capacitor 92A is connected in parallel with the windings 89 and 90 to prevent the back electromotive force (E.M.F.) from reaching a value which would cause discomfort to the operator.

As stated above, the electrical circuitry 12 is housed within the cabinet structure 11. The meter 26, a control knob for the variable resistance 64, the switch 34 and the power light 37 are mounted on the front face 93 thereof.

The cable 94 houses the conductors 16 and 24 and interconnects the cabinet 11 with the welding transformer 13.

The handle H comprises a hollow hand grip 97. The switch 85 is enclosed by a housing 96 which lies within and is secured to the hand grip 97 by a pair of screws 98 and 99. Conductors 101 and 102 are connected to terminals 103 and 104, respectively, on switch 85 and extend therefrom through conduit 106 to connection with the thyratron T2 and capacitor 88 of FIG. 4. The actuating lever 107 for switch 85 projects through an appropriately aligned opening in the upper surface of the housing 96.

Figure 3:
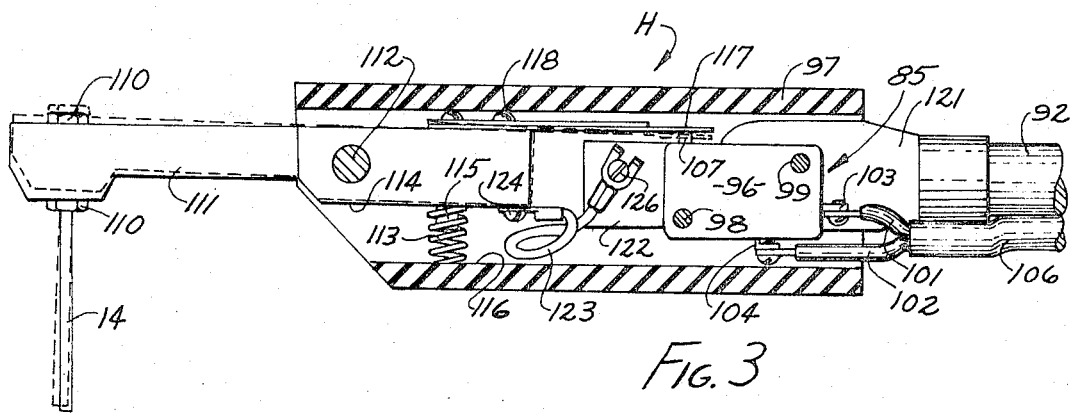
FIG. 3 is an enlarged sectional view taken along the line III-III in FIG. 1.

A conductive lever arm 111 extends substantially longitudinally from one end (the leftward end as seen in FIG. 3) of the handle H. The electrode 14 comprises a welding rod which extends downwardly from the lever arm 111 at its leftward end and is secured thereto by any convenient means, here nuts 110. The lever arm 111 is supported for pivotal movement in the plane which it defines with the electrode 14 by a pin 112. The pin 112 is located intermediate the ends of the lever arm 111 and is supported transversely within the hand grip 97 adjacent the leftward end thereof. A coil spring 113 is located beneath and bears against the underside 114 of the lever arm 111 to the right of the pivot pin 112. The spring 113 is located with respect to the lever arm 111 by a peg 115 pendant from the lever arm. The lower end of the spring 113 bears against the floor 116 of the hollow hand grip 97 and urges the interior end of the lever arm upwardly.

A leaf spring 117 is secured to the upper surface of the lever arm 111 by a pair of screws 118 and extends rightwardly therefrom to overlie the actuating lever 107 of switch 85.

The weld current conductor 92 is terminated in a lug 121. A conductive block 122 is fixed within the hand grip 97 by any convenient means, not shown, and the lug 121 is suitable secured thereto. A flexible conductor 123 extends between the conductive block 122 and the leftward end of the conductive lever arm 111, being secured thereto by screws 124 and 126, respectively, for completing the weld current flow path from the conductor 92 to the electrode 14.

OPERATION

Preparatory to welding, the sheet S of wire mesh screen to be repaired is covered at a defect or hole therein, not shown, with the patch P, the patch P overlapping the hole in the sheet S around the margin thereof to allow welding of the patch to the sheet. The apparatus 10 above mentioned is capable of welding screens of very fine wire size, for example fourdrinier screens having wires approximately .007 inches in diameter.

Conveniently, the patch is laid on top of the sheet S and the stationary electrode placed below and in supporting relation to the sheet S as indicated in FIG. 1. As discussed hereinafter in more detail, welding is carried out, with the weld transformer 13 energized as hereinafter discussed, placing the electrode 14 above the patch P and urging the free end of the electrode 14 toward the electrode 15 and against the patch P to effect a welding connection between patch and sheet. By repositioning the electrode 14 around the perimeter of the patch, the patch can be welded to the sheet in a manner to lock same mechanically thereto and to limit fluid to flow through the mesh of the patch or screen by preventing fluid flow between the patch and screen.

Considering the operation of the apparatus 10 in more detail, and turning first to the operation of the control circuitry 27, same is energized by closure of switch 34 (FIGS. 1 and 4) which applies an AC potential, preferably 110 bolts, or more, from the power line L1, L2 to the primary of power transformer 32. Closure of switch 34 also lights the lamp 37 indicating the circuitry 27 is in operation. The rectifier R conducts alternatively through its anodes 42 and 43 in correspondence with the alternating waveform appearing on the secondary winding 38 to provide a fully rectified waveform on the cathode thereof which waveform is positive with respect to the reference potential line 41. Capacitor 48 and inductor 51 act as filter elements to reduce the ripple content of the rectified waveform. The potentiometer 49 initially sets to a proper level the filtered DC potential appearing across the lines 52 and 41. The voltage regulator set 54 is connected across the DC supply lines 52 and 41 to reduce the effect on DC supply voltage of line voltage changes appearing across the lines L1, L2.

Thus, with the energization of rectifier tube R, a DC voltage appears across the lines 52 and 41 charging the capacitor 53 for purposes appearing hereinafter. In addition, the positive DC potential of line 52 is applied through resistor 56 to the plate of thyratron T1 raising the plate voltage thereof with respect to its cathode. Moreover, the positive potential from line 52 is applied through line 81 to the ignitor 28 of the ignitron 22. Simultaneously, this positive potential is applied across the voltage divider elements 83 and 84. As a result, current flowing from the positive potential line 52 through the voltage divider 83, 84, the resistor 87 and the capacitor 88 to the reference line 41 charges said capacitor at a rate determined by said resistances, the upper plate of capacitor 88 thus assuming the positive potential on the line 52. Since the switch 85 is in its normal open position, the positive potential on the capacitor 88 is not applied to the screen grid of thyratron T2.

The grids 61, 74 and 76 of thyratrons T1 and T2 are normally biased at reference potential by the respective resistors 62, 77 and 78. Thus, the thyratron T2 is normally nonconductive. On the other hand, the thyratron T1 alternates between conduction and nonconduction in synchronism with the AC waveform 130 appearing across secondary winding 38 of transformer 32, such waveform being indicated in part a of FIG. 5. More particularly, the phase shift network 63 when energized from the secondary winding 38 applies a phase shifted alternating potential 131, indicated in part b of FIG. 5 through resistor 67 to the grid of thyratron T1. The phase shifted alternating potential 131 lags the alternating supply potential 130 by a phase angle $\theta$ determined by the resistor 64. By varying the value of resistor 64, the phase angle $\theta$ may be varied from a value slightly greater than zero degrees determined by the fixed resistor 63a to a value at least approaching 180 degrees. Fixed resistor 63a provides a minimum phase delay sufficient to allow the anode potential of the ignitron 22 to rise to its minimum level for firing. Thus, as the phase shifted potential 131 sweeps through zero potential and rises therebeyond, the resulting positive potential on the grid 61 will initiate conduction of thyratron T1.

The leftward plate of capacitor 79 is normally held at a positive potential by the power supply 31 through resistor 56. Upon conduction of thyratron T1, the capacitor 79 discharges rapidly through the conductive thyratron T1, the reference line 41 and the resistor 77. The discharge current flowing through resistor 77 drops the potential of control grid 74 of thyratron T2 whereby to place a short duration negative pulse thereon once during each cycle of the AC source. The leftward plate of discharging capacitor 79 and, hence, the anode 59 of thyratron T1 drop rapidly in potential to a point below the ionization potential of the thyratron rendering the thyratron T1 nonconductive as indicated in parts c and d of FIG. 5.

After the thyratron T1 falls nonconductive, the plate 58 thereof is slowly restored to its former high potential by the positive potential line 52 through resistor 56 and by the same means, the capacitor 79 is slowly charged. The capacitor 79 is fully charged before occurrence of the earliest point in the cycle of the AC source at which thyratron T1 can fire.

Although the plate 71 of thyratron T2 is held at a positive potential by the line 52, the application of negative pulses to the control grid 74 cannot at this point effect conduction of thyratron T2 since the screen grid 76 thereof is biased zero potential by resistor 78 when the switch 85 is in its normal open state.

When it is desired to effect a weld, the operator manually grips the hand grip 97 and therewith urges the free end of the electrode 14 against the point on the workpiece set to be welded. As the end of the electrode 14 contacts the workpiece and is urged forcibly thereagainst, the electrode 14 and lever arm 111 are pivoted in a clockwise direction with respect to the hand grip 97, as indicated in FIG. 3 by the broken lines, such pivotal movement compressing spring 113. The resulting downward movement of the rightward end of lever arm 111 causes the leaf spring 117 to urge the switch actuator 107 downwardly to close the switch 85 thereby connecting conductors 101 and 102.

Closure of switch 85 (FIG. 4) connects the positively charged capacitor 88 to the screen grid 76 of the thyratron T2. The resulting positive potential on the screen grid 76 enables the thyratron T2 to conduct upon the appearance of the next negative pulse on the control grid 74. the thyratron T2 then conducts, discharging the relatively large capacitor 53 through the positive potential line 52, the line 81, and the ignitor 28 and cathode 21 of ignitron 22 to the reference line 41.

Such discharge is rapid and provides a high current pulse (part h of FIG. 5) through the ignitor and cathode of ignitron 22 sufficient to fire said ignitron given a positive anode to cathode potential thereon as hereinafter discussed. In view of the low resistance of this discharge path of capacitor 53, the potential thereacross quickly falls causing the anode potential of thyratron T2 to drop below the ionization potential thereof extinguishing same. After the thyratron T2 stops conducting, the power supply 31 recharges the capacitor 53 through the resistance 49 and the inductance 51 for a future weld.

It will be noted that the capacitor 88 discharges through the thyratron T2 during its momentary conduction described above. While the switch 85 is closed, the capacitor 88 is shunted by resistor 78 which is sufficiently small as to prevent the capacitor 88 from recharging through the resistive path 83, 84, 87 thus preventing another firing of thyratron T2.

The aforementioned discharge of the capacitor 53 through the ignitor and cathode of the ignitron 22 and thyratron T2 fires the ignitron at the phase point of the positive half cycle of the AC waveform applied to the anode 23 thereof determined by the phase shift network 63. As a result, the ignitron conducts for the remainder 141 (FIG. 5, part i) of that positive half cycle through the weld transformer 13 and the power source L1, L2. Welding current thus flows, for the remaining portion 141 of the positive half cycle, from the secondary windings 89 and 90 of the welding transformer through cable 92, electrode 14, workpiece members P and S, stationary electrode 15 and cable 91. In consequence, a precisely controlled quantity of electrical energy passes through the weld zone and welds the portions of the patch P and sheet S beneath the electrode 14 together. The circuit 12 is capable of providing sufficient weld current to securely weld the patch P to the sheet S as it is pressed thereagainst by the electrode 14. The weld time is very short, since only a portion of a single half cycle of weld current is applied, so that material adjoining the weld zone is not materially heated and damage thereto is avoided.

Since the thyratron T1 can be fired at virtually any point in the positive half cycle applied to the ignitor 28, the firing point of the ignitron 22 can be varied to cause it to conduct from substantially one-half cycle of weld current to zero weld current. Thus, the amount of weld current applied to the workpiece is precisely controllable by variation of the resistance 64. The weld time ends as the anode 23 of the ignitron 22 falls negative with respect to the cathode thereof with the phase reversal 142 of the alternating supply L1, L2, causing the ignitron to stop conduction.

With the termination of the welding half cycle, the circuit 12 is prevented from conducting further weld current while the switch 85 is in its closed position for lack of conductive bias on the screen grid 76 of thyratron T2. Thus, the operator may hold the welding electrode 14 against workpiece after completion of a weld without fear of applying additional, unwanted quantities of weld current to the workpiece.

Upon opening of the switch 85, the capacitor 88 is free to charge once again to its normal "at rest" condition through the resistances 87, 84, 83 from the positive potential line 52. The switch 85 open when the operator moves the handle H away from the workpiece disengaging the electrode 14 therefrom. The resulting release of upward (as seen in FIG. 3) force on the outer end of the lever arm 111 allows the spring 113 to pivot same with respect to the hand grip 97 and in a counterclockwise direction whereby the leaf spring 117 releases the actuator 107 of switch 85. Thereafter, further welds in succession, around the perimeter of patch P, may be effected in the manner above described.

Figure 2:
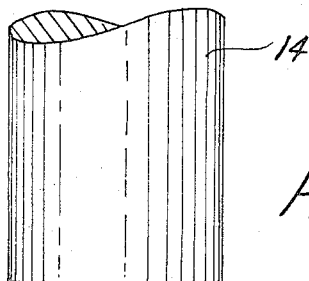
FIG. 2 is an enlarged sectional view taken along the line II-II in FIG. 1.

Under normal circumstances, the warp and woof wires of a fourdrinier screen are arranged to form rectangular openings and the wires in the patch advantageously define square openings. Thus, the intersections or "knuckles" of the patch cannot fall within all of the openings in the screen. However, in order to further minimize such blocking of the openings in the screen by the knuckles of the patch, the wires of the patch are preferably of smaller gauge than, and are arranged approximately at 45 degree angles to, the wires of the screen. For convenience of illustration, the patch wires are shown as parallel with, and of about the same gauge as, the screen wires in FIG. 2.

Although a preferred embodiment of the invention has been disclosed above for purposes of illustration, it will be apparent that modifications and variation within the scope of the appended claims are fully contemplated.

We claim:

1. A welding apparatus connectable to a source of electrical potential for welding a patch of electrically conductive and fine mesh wire screen to a sheet of fine mesh wire screen, comprising:

first and second electrode means connectable in circuit with said source for energization thereby and engageable, respectively, with said patch and said sheet, one of said electrode means having a relatively small screen engaging surface;

grip means pivotally supporting said one electrode means for pivotal movement in one direction of a relatively small amount as said one electrode is urged against said screen;

first switch means actuable in response to pivotal movement of said one electrode in one direction; and second switch means in circuit with said electrodes and said source and control means responsive to actuation of said first switch means for causing said second switch means to conduct a single pulse of weld current of a preselected time duration and following said pulse for preventing further energization of said second switch means at least before said first switch means is deactuated.

2. The apparatus defined in claim 1 in which said grip means comprises a hand grip and a lever arm pivotally mounted on said hand grip and extending from one end thereof, said one electrode means being fixed to an extending from said lever in spaced relation to said hand grip, said first switch means being fixed to said hand grip adjacent said lever arm and actuating means extending from said lever arm for actuating said first switch means upon pivotal movement of said lever arm in one direction, said lever arm being pivotable in said one direction with respect to said handle grip in response to urging of said one electrode against the one of said patch and sheet engageable thereby for welding.

3. The device defined in claim 2 including conductor means for connecting said one electrode in circuit with said source and means terminating said conductor means and locating same in fixed relation to said hand grip; and a flexible conductor for connecting said terminating means to said lever arm in spaced relation to said one electrode means, said hand grip enclosing said terminating means, said switch means, said flexible conductor and a portion of said lever arm remote from said one electrode means.

4. The apparatus defined in claim 3 in which said actuating means comprises a flexible leaf spring fixedly attached to said lever arm for contacting said first switch means; and including:

a pin extending transversely to the plane defined by said lever arm and one electrode means whereby said one electrode means travels within said plane in response to pivotable movement of said lever arm; and further including;

resilient means disposed between said lever arms and a portion of said hand grip for urging said actuating means away from said first switch means and for simultaneous urging said electrode in the direction of its welding end.

5. The apparatus defined in claim 1 in which said source is an alternating potential source and said control means comprises means for producing periodic pulses in synchronism with said alternating source and a trigger device responsive to concurrence of the actuated condition of said first switch means and one of said periodic pulses for causing said second switch means to apply weld current to said electrode means in selected phase relationship with said alternating source.

6. The apparatus defined in claim 5 wherein said control means further includes storage means connected in circuit with said trigger device by actuation of said first switch means for applying a conduction enabling potential to said trigger device, said storage means being responsive to conduction of said trigger device for discharging and means for holding said storage means in discharged condition following cessation of conduction of said trigger device and while said first switch means remains actuated, said trigger device being connected in circuit with said second switch means to actuate same for conduction of weld current therethrough upon conduction of said trigger device.

7. The apparatus defined in claim 1 wherein the mesh of the patch is somewhat coarser than the mesh of the sheet.